United States Patent
Lee et al.

(10) Patent No.: US 10,685,271 B2
(45) Date of Patent: Jun. 16, 2020

(54) INTEGRATED CIRCUIT AND ELECTRONIC TAG FOR PROCESSING UHF RFID SIGNAL AND NFC SIGNAL AND METHOD FOR PROVIDING DATA PROCESSING SERVICE

(71) Applicant: 3A LOGICS Co., LTD., Seongnam-si, Gyeonggi-do (KR)

(72) Inventors: Pyeong Han Lee, Seongnam-si (KR); Kwang Beom Park, Seongnam-si (KR); Sung Hun Chun, Gunpo-si (KR); Chang Ho Ryu, Seongnam-si (KR); Sung Wan Kim, Gwangju-si (KR)

(73) Assignee: 3A LOGICS Co., LTD., Seongnam-si (KR)

( * ) Notice: Subject to any disclaimer, the term of this patent is extended or adjusted under 35 U.S.C. 154(b) by 0 days.

(21) Appl. No.: 16/194,437

(22) Filed: Nov. 19, 2018

(65) Prior Publication Data
US 2020/0143218 A1    May 7, 2020

(30) Foreign Application Priority Data
Nov. 6, 2018    (KR) .......................... 10-2018-0135387

(51) Int. Cl.
 G06K 19/07    (2006.01)
 H04W 4/80    (2018.01)
 G06K 19/077    (2006.01)

(52) U.S. Cl.
 CPC ... *G06K 19/0724* (2013.01); *G06K 19/07767* (2013.01); *H04W 4/80* (2018.02)

(58) Field of Classification Search
 CPC ........ G06K 19/0724; G06K 19/07767; H04W 4/80
 See application file for complete search history.

(56) References Cited

U.S. PATENT DOCUMENTS 9,489,813 B1 *  11/2016  Beigel ................ G08B 13/2417
2005/0186904 A1  8/2005  Kowalski et al.
(Continued)

FOREIGN PATENT DOCUMENTS

KR    10-2012-0139613    12/2012
KR    10-1602784    11/2016
(Continued)

OTHER PUBLICATIONS

T. Ussmueller et al., "A multistandard HF/UFH-RFID-tag with integrated interface and localization capability," Proc. 2012 IEEE Conference on RFID, IEEE, pp. 66-73 (Apr. 5, 2012).

*Primary Examiner* — Brian A Zimmerman
*Assistant Examiner* — Kevin Lau

(57) ABSTRACT

An integrated circuit is disclosed. The integrated circuit includes a UHF RFID tag physical layer that rectifies a UHF RFID signal acquired through a first antenna using a first rectifier to generate a first DC voltage, an NFC tag physical layer that rectifies an NFC signal acquired through a second antenna to generate a second DC voltage, a microcontroller unit, a non-volatile memory that stores data processed and data to be processed by the UHF RFID tag physical layer, and data processed and data to be processed by the NFC tag physical layer under control of the microcontroller unit, and a detector that detects a voltage input of one of the first DC voltage and the second DC voltage, and supplies the detected DC voltage to one of the UHF RFID tag physical layer and the NFC tag physical layer, the microcontroller unit, and the non-volatile memory.

11 Claims, 3 Drawing Sheets

(56) References Cited

U.S. PATENT DOCUMENTS

| | | | |
|---|---|---|---|
| 2012/0322500 A1* | 12/2012 | Charrat | G06K 19/07767 |
| | | | 455/552.1 |
| 2014/0247153 A1* | 9/2014 | Proud | H04W 4/21 |
| | | | 340/870.09 |
| 2016/0183034 A1* | 6/2016 | Konanur | H04B 5/0031 |
| | | | 455/41.1 |
| 2018/0114106 A1* | 4/2018 | Pheil | H04B 1/385 |

FOREIGN PATENT DOCUMENTS

| KR | 10-2017-0123074 | 7/2017 |
|---|---|---|
| KR | 10-2018-0095339 | 8/2018 |

* cited by examiner

INTEGRATED CIRCUIT AND ELECTRONIC TAG FOR PROCESSING UHF RFID SIGNAL AND NFC SIGNAL AND METHOD FOR PROVIDING DATA PROCESSING SERVICE

CROSS-REFERENCE TO RELATED APPLICATION

This application claims priority under 35 U.S.C. § 119 from Korean Patent Application No. 10-2018-0135387 filed on Nov. 6, 2018, the disclosures of which are hereby incorporated by reference in their entireties.

TECHNICAL FIELD

Embodiments of the present inventive concept relate to an integrated circuit (IC), and particularly to an IC capable of detecting a rectified voltage for a UHF radio-frequency identification (RFID) signal or a rectified voltage for an NFC signal, and processing the UHF RFID signal or the NFC signal using the rectified voltage corresponding to a result of the detection, an electronic tag including the IC, and a method of providing data processing service.

DISCUSSION OF RELATED ART

Radio-frequency identification (RFID) uses electromagnetic fields to automatically identify and track tags attached to objects. The RFID includes an RFID tag and a reader, and the RFID is a technology for recognizing information in a non-contact manner at a long distance using radio waves. The RFID tag includes an antenna and an integrated circuit, records information in the integrated circuit, and transmits the information to a reader through the antenna.

The RFID tag (electronic tag or tag) includes information electronically stored. A passive tag collects energy from radio waves of an RFID reader nearby. An active tag includes a local power source such as a battery.

SUMMARY

An object of the present inventive concepts is to provide an integrated circuit (IC) which can communicate with both a UHF RFID signal and an NFC signal, detect one of a rectified voltage for the UHF RFID signal and a rectified voltage for the NFC signal, and process one of the UHF RFID signal and the NFC signal using a rectified voltage corresponding to a result of the detection, an electronic tag including the IC, and a method of providing data processing service.

An exemplary embodiment of the present inventive concepts is directed to an integrated circuit, including a UHF RFID tag physical layer that rectifies a UHF RFID signal acquired through a first antenna using a first rectifier to generate a first DC voltage, an NFC tag physical layer that rectifies an NFC signal acquired through a second antenna to generate a second DC voltage, a microcontroller unit, a non-volatile memory that stores data processed and data to be processed by the UHF RFID tag physical layer, and data processed and data to be processed by the NFC tag physical layer under control of the microcontroller unit, and a detector that detects a voltage input of one of the first DC voltage and the second DC voltage, and supplies a detected DC voltage to one of the UHF RFID tag physical layer and the NFC tag physical layer, the microcontroller unit, and the non-volatile memory.

Another exemplary embodiment of the present inventive concepts is directed to an electronic tag, including a first antenna, a second antenna, and an integrated circuit that is connected to the first antenna and the second antenna, in which the integrated circuit includes a UHF RFID tag physical layer that rectifies a UHF RFID signal acquired through the first antenna using a first rectifier to output a first DC voltage, an NFC tag physical layer that rectifies an NFC signal acquired through the second antenna to output a second DC voltage, a microcontroller unit, a non-volatile memory that stores data processed and data to be processed by the UHF RFID tag physical layer, and data processed and data to be processed by the NFC tag physical layer under control of the microcontroller unit, and a detector that detects a voltage input of one of the first DC voltage and the second DC voltage, and supplies the detected DC voltage to one of the UHF RFID tag physical layer and the NFC tag physical layer, the microcontroller unit, and the non-volatile memory.

Still another exemplary embodiment of the present inventive concepts is directed to a method of providing data processing service using an electronic tag that performs an operation of transmitting or receiving a UHF RFID signal to or from a UHF RFID communication device through a first antenna and an operation of transmitting or receiving an NFC signal to or from an NFC device through a second antenna, including detecting, by the electronic tag, whether a first DC voltage corresponding to a result of the rectification of the UHF RFID signal is generated by a UHF RFID tag physical layer, supplying, by the electronic tag, the first DC voltage to the UHF RFID tag physical layer, a microcontroller unit, and a non-volatile memory when the first DC voltage is detected, detecting, by the electronic tag, whether a second DC voltage corresponding to a result of the rectification of the NFC signal is generated by an NFC tag physical layer when the first DC voltage is not detected, and supplying, by the electronic tag, the second DC voltage to the NFC tag physical layer, the microcontroller unit, and the non-volatile memory when the second DC voltage is detected, in which the UHF RFID tag physical layer rectifies the UHF RFID signal acquired through the first antenna using a voltage multiplier circuit to generate the first DC voltage, the NFC tag physical layer rectifies the NFC signal acquired through the second antenna using a bridge rectifier circuit to generate the second DC voltage, the microcontroller unit stores first data processed and second data to be processed by the UHF RFID tag physical layer, and third data processed and fourth data to be processed by the NFC tag physical layer in the non-volatile memory, and the UHF RFID tag physical layer, the NFC tag physical layer, the microcontroller unit, and the non-volatile memory are integrated in the electronic tag.

BRIEF DESCRIPTION OF THE DRAWINGS

These and/or other aspects and advantages of the present general inventive concept will become apparent and more readily appreciated from the following description of the embodiments, taken in conjunction with the accompanying drawings of which.

DETAILED DESCRIPTION OF EXEMPLARY EMBODIMENTS

Figure 1:
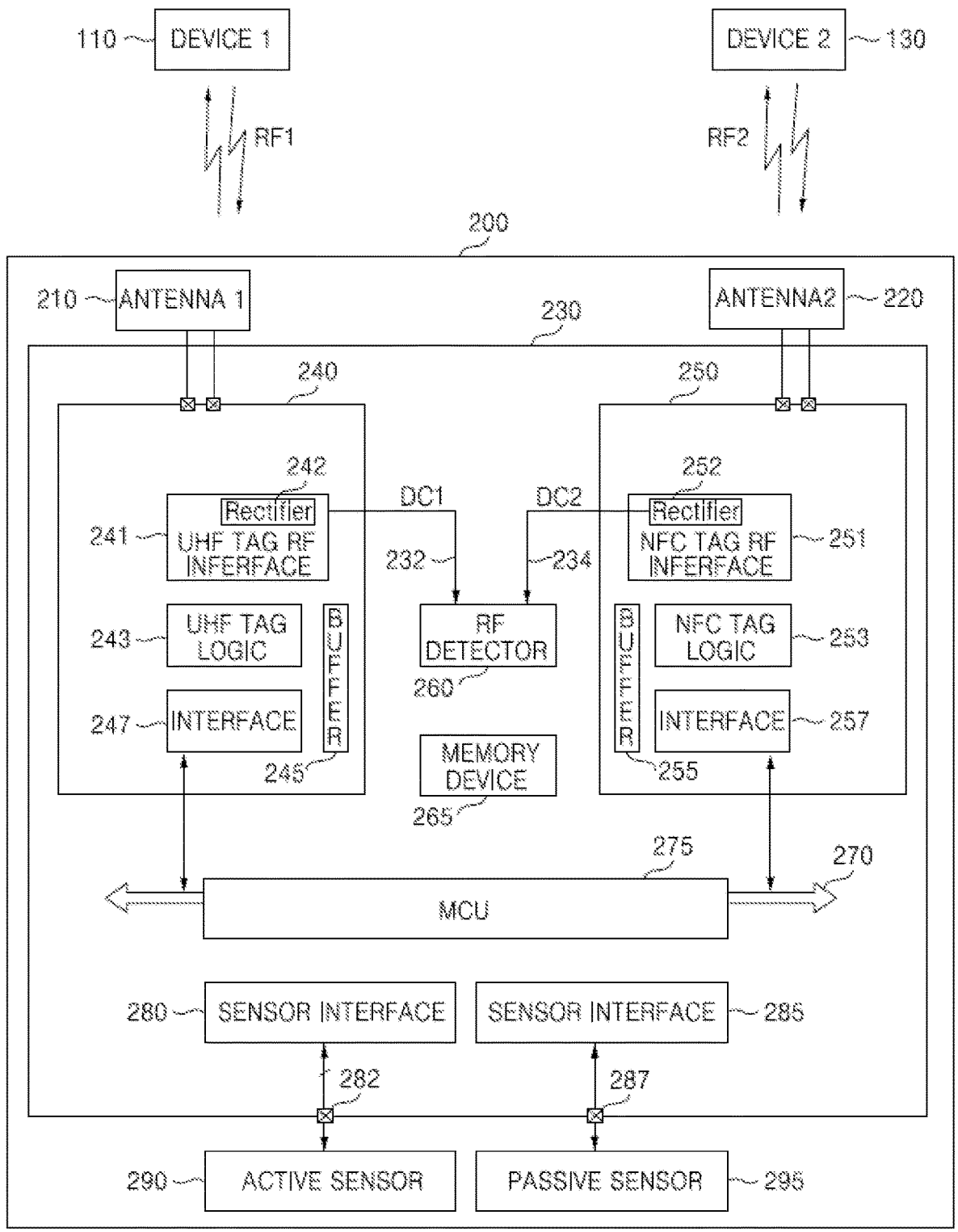
FIG. 1 is a block diagram of an electronic tag according to an exemplary embodiment of the present inventive concepts.

Reference will now be made in detail to the embodiments of the present general inventive concept, examples of which are illustrated in the accompanying drawings, wherein like reference numerals refer to the like elements throughout. The embodiments are described below in order to explain the present general inventive concept by referring to the figures.

FIG. 1 is a block diagram of an electronic tag according to an exemplary embodiment of the present inventive concepts. Referring to FIG. 1, a tag or electronic tag 200 includes a first antenna 201, a second antenna 220, an integrated circuit 230, an active sensor 290, and a passive sensor 295. The tag or electronic tag 200 or 200A can be used for an internet of things (IoT) device or an information and communication technology (ICT) device.

The first antenna 210 may transmit or receive a first RF signal, for example, a ultra-high frequency radio-frequency identification (UHF RFID) signal RF1, to or from a first wireless communication device 110. The first antenna 210 may be formed as a di-pole antenna for UHF RFID communication. The second antenna 220 may transmit or receive a second RF signal, for example, a near field communication (NFC) signal RF2, to or from a second wireless communication device 130. The second antenna 220 may be formed as a coil antenna or a loop antenna for NFC communication.

The integrated circuit 230 may refer to a system on chip (SoC), and may refer to a semiconductor chip manufactured by a CMOS process.

The integrated circuit 230 includes a UHF RFID tag physical layer 240, an NFC tag physical layer 250, a detector 260, a non-volatile memory 265, a microcontroller unit 275, an active sensor interface 280, and a passive sensor interface 285. Here, a physical layer is called PHY, and is implemented as a PHY chip. The physical layer consists of electronic circuit transmission technologies of a network.

Conventionally, an integrated circuit for processing only UHF RFID signals and an integrated circuit for processing only NFC signals are used as separate integrated circuits. However, since the UHF RFID tag physical layer 240 and the NFC tag physical layer 250 are integrated into one integrated circuit 230, a UHF RFID signal and an NFC signal can be processed by using one integrated circuit 230. As a result, the UHF RFID tag physical layer 240 and the NFC tag physical layer 250 share one silicon substrate.

The UHF RFID tag physical layer 240 may rectify a UHF RFID signal RF1 acquired through the first antenna 210 using a first rectifier 242 to generate a first DC voltage DC1. The UHF RFID tag physical layer 240 includes a UHF tag RF interface 241 including the first rectifier 242, a UHF tag logic circuit 243, a first buffer 245, and a first interface 247.

The UHF tag RF interface 241 may include the first rectifier 242 and a first modulator/demodulator. The first rectifier 242 may be implemented as a voltage multiplier circuit, and the first modulator/demodulator may demodulate a UHF RFID signal acquired through the first antenna 210 to generate first demodulated data, modulate first transmission data to generate a UHF RFID modulated signal, and transmit the UHF RFID modulated signal to the first wireless communication device 110 through the first antenna 210.

The UHF tag logic circuit 243 is a digital logic circuit which can transmit the first demodulated data to the first buffer 245 or the first interface 247, or transmit first transmission data received from the first buffer 245 or the first interface 247 to the first modulator/demodulator.

The UHF tag logic circuit 243 and the non-volatile memory 265 may transmit or receive data (for example, the first demodulated data or the first transmission data) through the first buffer 245. The UHF tag logic circuit 243 and the microcontroller unit 275 may transmit or receive data (for example, the first demodulated data or the first transmission data) through the first interface 247 and a bus 270.

The detector 260 may receive a first DC voltage (or a first rectified voltage) DC1 output from the first rectifier 242 of the UHF tag RF interface 241 through a first voltage transmission line 232.

The NFC tag physical layer 250 may rectify an NFC signal RF2 acquired through the second antenna 220 using a second rectifier 252 to generate a second DC voltage DC2. The NFC tag physical layer 250 includes an NFC tag RF interface 251 including the second rectifier 252, an NFC tag logic circuit 253, a second buffer 255, and a second interface 257.

The NFC tag RF interface 251 may include the second rectifier 252 and a second modulator/demodulator. The second rectifier 252 may be implemented as a bridge rectifier circuit. The second modulator/demodulator may demodulate an NFC signal acquired through the second antenna 220 to generate second demodulated data, and receive and modulate second transmission data to generate an NFC modulated signal, and transmit the NFC modulated signal to the second wireless communication device 130 through the second antenna 220.

The NFC tag logic circuit 253 is a digital logic circuit which can transmit the second demodulated data to the second buffer 255 or the second interface 257, or can transmit the second transmission data received from the second buffer 255 or the second interface 257 to the second modulator/demodulator.

The NFC tag logic circuit 253 and the non-volatile memory 265 may transmit or receive data (for example, the second demodulated data or the second transmission data) to or from each other through the second buffer 255. The NFC tag logic circuit 253 and the microcontroller unit 275 may transmit or receive data (for example, the second demodulated data or the second transmission data) to or from each other through the second interface 257 and the bus 270.

The detector 260 may receive a second DC voltage (or a second rectified voltage) DC2 output from the second rectifier 252 of the NFC tag RF interface 251 through a second voltage transmission line 234. That is, the detector 260 may include a first input pin (a first input pad or a first input terminal) connected to the first voltage transmission line 232 and a second input pin (a second input pad or a second input terminal) connected to the second voltage transmission line 234.

The non-volatile memory 265 may be implemented as an electrically erasable programmable read-only memory (EEPROM) or a flash memory. Under control of the microcontroller unit 275, the non-volatile memory 265 may store data (for example, the first demodulated data) processed and data (for example, the first transmission data) to be processed by the UHF RFID tag physical layer 240, and data (for example, the second demodulated data) processed and data (for example, the second transmission data) to be processed by the NFC tag physical layer 250.

The detector 260 may detect a voltage input of one of the first DC voltage DC1 and the second DC voltage DC2, and supply a detected DC voltage DC1 or DC2 to one of the UHF RFID tag physical layer 240 and the NFC tag physical layer 250 (240 or 250), the microcontroller unit 275, and the non-volatile memory 265.

In addition, the DC voltage DC1 or DC2 output from the detector 260 may be transmitted to the sensor interfaces 280 and 285. As a result, the DC voltage DC1 or DC2 may be used as operation voltages of the sensor interfaces 280 and 285.

When only an input of the first DC voltage DC1 is detected, the detector 260 supplies the first DC voltage DC1 to the UHF RFID tag physical layer 240, and does not supply it to the NFC tag physical layer 250. When only an input of the second DC voltage DC2 is detected, the detector 260 does not supply the second DC voltage DC2 to the UHF RFID tag physical layer 240, and supplies it to the NFC tag physical layer 250.

The microcontroller unit 275 refers to a controller as a digital logic circuit, and a non-volatile memory (for example, an EEPROM or a flash memory) for storing programs necessary for an operation of the microcontroller unit 275 may be included in the microcontroller unit 275.

The microcontroller unit 275 may transmit or receive data (for example, the first demodulated data, the second demodulated data, the first transmission data, and/or the second transmission data) to or from a corresponding interface 247 or 257 through the bus 270.

The active sensor interface 280 may transmit or receive signals to or from the active sensor 290 through a first pin 282 under control of the microcontroller unit 275. Here, the first pin 282 collectively refers to one or a plurality of pins, and may refer to a first pad or first pads.

According to exemplary embodiments, the active sensor interface 280 may have a structure for general-purpose input/output (GPIO), an inter-integrated circuit (I2C), a universal asynchronous receiver/transmitter (UART), or a serial peripheral interface bus (SPI).

The active sensor interface 280 does not include a driver that transmits a driving signal to the active sensor 290, and an analog-to-digital converter that converts a sensing signal generated by the active sensor 290 in accordance with the driving signal into a digital signal. However, the active sensor 290 may be implemented as a chip including circuit components corresponding to the driver and the analog-to-digital converter.

The passive sensor interface 285 may transmit or receive signals to or from the passive sensor 290 through a second pin 287 under control of the microcontroller unit 275. Here, the second pin 287 collectively refers to one or a plurality of pins, and may refer to a second pad or second pads.

The passive sensor interface 285 includes a driver that transmits a driving signal to the passive sensor 295 and an analog-to-digital converter that converts a sensing signal generated by the passive sensor 295 into a digital signal. According to exemplary embodiments, an output terminal of the driver and an input terminal of the analog-to-digital converter may be connected to the second pin 287.

The number of the first pins 282 connecting the active sensor interface 280 and the active sensor 290 is more than the number of the second pins 287 connecting the passive sensor interface 285 and the passive sensor 295. The number of signal lines connected to the first pin 282 for connecting the active sensor interface 280 and the active sensor 290 is more than the number of signal lines connected to the second pin 287 for connecting the passive sensor interface 285 and the passive sensor 295.

Figure 2:
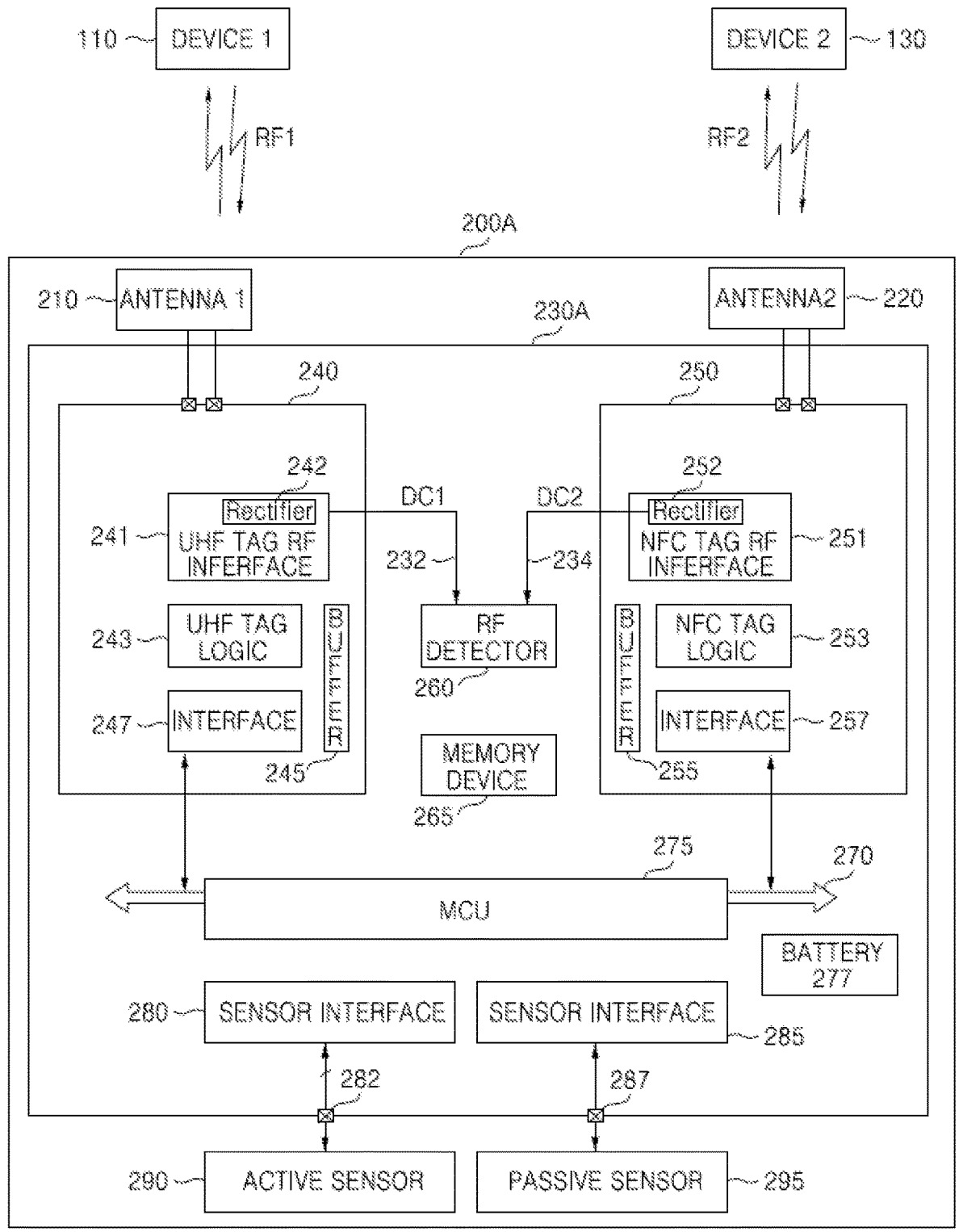
FIG. 2 is a block diagram of an electronic tag including a battery according to an exemplary embodiment of the present inventive concepts.

FIG. 2 is a block diagram of an electronic tag including a battery according to an exemplary embodiment of the present inventive concepts. Referring to FIG. 2, the tag or electronic tag 200A includes the first antenna 210, the second antenna 220, an integrated circuit 230A, the active sensor 290, and the passive sensor 295. The integrated circuit 230A may be an active tag including a battery 277. Except for the battery 277, the structure and function of the electronic tag 200 of FIG. 1 is the same as or similar to the structure and function of the electronic tag 200A of FIG. 2. Although the battery 277 is illustrated in the integrated circuit 230A in FIG. 2, the battery 277 may be disposed outside the integrated circuit 230A.

In the electronic tag 200A including the battery 277, even if neither the first DC voltage DC1 nor the second DC voltage DC2 is generated, the microcontroller unit 275 may use a voltage of the battery 277 for debugging.

In addition, in the electronic tag 200A including the battery 277, even if neither the first DC voltage DC1 nor the second DC voltage DC2 is generated, the electronic tag 200A may operate as a data logger that stores necessary data in the non-volatile memory 265 using the voltage of the battery 277.

Figure 3:
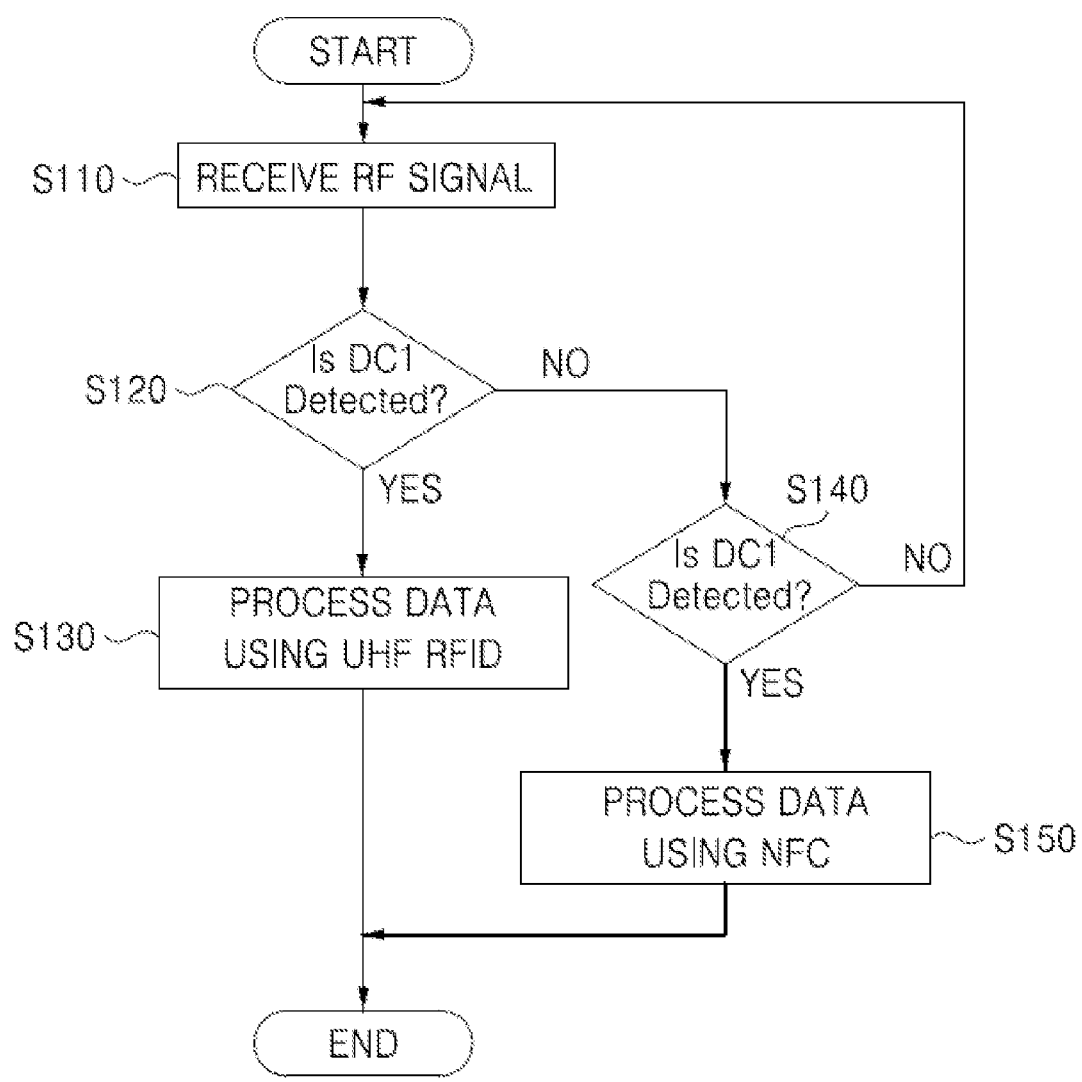
FIG. 3 is a flowchart for describing a method of providing data processing service using the electronic tag according to the present embodiment of the present inventive concepts.

FIG. 3 is a flowchart which describes a method of providing data processing service using the electronic tag according to the present embodiment of the present inventive concepts. The method of providing data processing service may be used for logistics service or authentication-based service.

The method of providing data processing service using the electronic tag 200 or 200A which performs an operation of transmitting or receiving a UHF RFID signal RF1 to or from the UHF RFID communication device 110 through the first antenna 210 and an operation of transmitting or receiving the NFC signal RF2 to or from the NFC device 130 through the second antenna 220 has been described with reference to FIGS. 1 to 3.

It is assumed that the electronic tag 200 or 200A receives an RF signal RF1 or RF2 output from the device 110 or 130 (S110).

The electronic tag 200 or 200A detects whether the first DC voltage DC1 corresponding to a result of the rectification of the UHF RFID signal RF1 is generated by the UHF RFID tag physical layer 240 (S120).

When the first DC voltage DC1 is detected by the detector 260 (YES in S120), the electronic tag 200 or 200A supplies the first DC voltage DC1 generated by the first rectifier 242 to the UHF RFID tag physical layer 240, the microcontroller unit 275, and the non-volatile memory 265. According to exemplary embodiments, the first DC voltage DC1 may be supplied to the sensor interfaces 280 and 285.

In the present specification, exemplary embodiments in which the detector 260 supplies the first DC voltage DC1 or the second DC voltage DC2 to components (240, 265, and 275, including 280 and 285 according to exemplary embodiments) are illustrated and described; however, the first DC voltage DC1 or the second DC voltage DC2 output from the detector 260 may be supplied to the components (240, 265, and 275, including 280 and 285 according to exemplary embodiments) by a power management unit or a power management circuit.

As a result, the supply of the DC voltage DC1 or DC2 to the components by the detector 260 includes both a case in which the DC voltage DC1 or DC2 is directly supplied to the components by the detector 260 and a case in which a DC voltage newly generated based on the DC voltage DC1 or DC2 is supplied to the components.

As the first DC voltage DC1 is supplied to the UHF RFID tag physical layer 240, the electronic tag 200 or 200A processes data corresponding to the first RF signal RF1, that is, the UHF RFID signal RF1 (S130). For example, the UHF RFID signal RF1 transmitted or received between the electronic tag 200 or 200A and the first wireless communication device 110 may be a signal related to an operation of each of the sensors 290 and 295, but the present embodiment is not limited thereto.

When the first DC voltage DC1 is not detected by the detector 260 (NO in S120), the electronic tag 200 or 200A detects whether the second DC voltage DC2 corresponding to a result of the rectification of the NFC signal RF2 is generated by the NFC tag physical layer 250 (S140).

When the second DC voltage DC2 is detected by the detector 260 (YES in S140), the electronic tag 200 or 200A supplies the second DC voltage DC2 to the NFC tag physical layer 250, the microcontroller unit 275, and the non-volatile memory 265. According to exemplary embodiments, the second DC voltage DC2 may be supplied to the sensor interfaces 280 and 285.

As the second DC voltage DC1 is supplied to the NFC tag physical layer 250, the electronic tag 200 or 200A processes data corresponding to the second RF signal RF2, that is, the NFC signal RF2, using an NFC technology (S130). For example, the NFC signal RF2 transmitted or received between the electronic tag 200 or 200A and the second wireless communication device 130 may be a signal related to the operation of each of the sensors 290 and 295, but the present embodiment is not limited thereto.

When neither of the DC voltages DC1 and DC2 is detected (NO in S120 and NO in S140), the electronic tag 200 or 200A remains in a standby state.

The integrated circuit and the electronic tag which can detect both a UHF RFID signal and an NFC signal, and the method of providing data processing service according to the exemplary embodiment of the present inventive concepts can detect a rectified voltage corresponding to a received signal even if any one of the UHF RFID signal and the NFC signal is received, and can process the received signal using the rectified voltage which is a result of the detection. As a result, efficiency of signal processing can be improved.

Moreover, since a UHF RFID tag physical layer and an NFC tag physical layer are integrated into one integrated circuit or an electronic tag, the integrated circuit or the electronic tag according to the exemplary embodiments of the present inventive concepts can process both a UHF RFID signal and an NFC signal as compared to a conventional integrated circuit.

Although a few embodiments of the present general inventive concept have been shown and described, it will be appreciated by those skilled in the art that changes may be made in these embodiments without departing from the principles and spirit of the general inventive concept, the scope of which is defined in the appended claims and their equivalents.

What is claimed is:

1. An integrated circuit comprising:
a UHF RFID tag physical layer that rectifies a UHF RFID signal acquired through a first antenna using a first rectifier to generate a first DC voltage;
an NFC tag physical layer that rectifies an NFC signal acquired through a second antenna using a second rectifier to generate a second DC voltage;
a microcontroller unit;
a non-volatile memory that stores data processed and data to be processed by the UHF RFID tag physical layer, and data processed and data to be processed by the NFC tag physical layer under control of the microcontroller unit;
a detector that detects a voltage input of one of the first DC voltage and the second DC voltage, and supplies a detected DC voltage to one of the UHF RFID tag physical layer and the NFC tag physical layer, the microcontroller unit, and the non-volatile memory;
a first voltage transmission line that is connected between the UHF RFID tag physical layer and a first input terminal of the detector for transmission of the first DC voltage; and
a second voltage transmission line that is connected between the NFC tag physical layer and a second input terminal of the detector for transmission of the second DC voltage,
wherein the detector supplies the first DC voltage to the UHF RFID tag physical layer and does not supply it to the NFC tag physical layer when only the input of the first DC voltage is detected, and does not supply the second DC voltage to the UHF RFID tag physical layer and supplies it to the NFC tag physical layer when only the input of the second DC voltage is detected.

2. The integrated circuit of claim 1,
wherein the first rectifier is a voltage multiplier circuit, and the second rectifier is a bridge rectifier circuit.

3. The integrated circuit of claim 2, further comprising:
an active sensor interface that is connected between the microcontroller unit and a plurality of first pins disposed at an edge of the integrated circuit; and
a passive sensor interface that is connected between the microcontroller unit and a plurality of second pins disposed at the edge of the integrated circuit,
wherein the number of the first pins is more than the number of the second pins.

4. The integrated circuit of claim 3, wherein the passive sensor interface includes
a driver that is connected to one of the plurality of second pins, and
an analog-to-digital converter that is connected to the one of the plurality of second pins.

5. An electronic tag comprising:
a first antenna;
a second antenna; and
an integrated circuit that is connected to the first antenna and the second antenna,
wherein the integrated circuit includes
a UHF RFID tag physical layer that rectifies a UHF RFID signal acquired through the first antenna using a first rectifier to output a first DC voltage;
an NFC tag physical layer that rectifies an NFC signal acquired through the second antenna using a second rectifier to output a second DC voltage;
a microcontroller unit;
a non-volatile memory that stores data processed and data to be processed by the UHF RFID tag physical layer, and data processed and data to be processed by the NFC tag physical layer under control of the microcontroller unit;
a detector that detects a voltage input of one of the first DC voltage and the second DC voltage, and supplies a detected DC voltage to one of the UHF RFID tag physical layer and the NFC tag physical layer, the microcontroller unit, and the non-volatile memory;

a first voltage transmission line that is connected between the UHF RFID tag physical layer and a first input terminal of the detector for transmission of the first DC voltage; and a second voltage transmission line that is connected between the NFC tag physical layer and a second input terminal of the detector for transmission of the second DC voltage, wherein the detector supplies the first DC voltage to the UHF RFID tag physical layer and does not supply it to the NFC tag physical layer when only the input of the first DC voltage is detected, and does not supply the second DC voltage to the UHF RFID tag physical layer and supplies it to the NFC tag physical layer when only the input of the second DC voltage is detected.

6. The electronic tag of claim 5, further comprising:
an active sensor; and
a passive sensor,
wherein the integrated circuit further includes
an active sensor interface that is connected between the microcontroller unit and the active sensor, and
a passive sensor interface that is connected between the microcontroller unit and the passive sensor,
wherein the number of first signal lines connected between the active sensor interface and the active sensor is more than the number of second signal lines connected between the passive sensor interface and the passive sensor.

7. The electronic tag of claim 6, wherein the first antenna is a di-pole antenna, the second antenna is one of a coil antenna and a loop antenna, the first rectifier is a voltage multiplier circuit, and the second rectifier is a bridge rectifier circuit.

8. The electronic tag of claim 7, further comprising a battery,
wherein the microcontroller unit uses a voltage of the battery for debugging even though neither the first DC voltage nor the second DC voltage is generated.

9. The electronic tag of claim 7, further comprising a battery,
wherein the electronic tag operates as a data logger using a voltage of the battery even though neither the first DC voltage nor the second DC voltage is generated.

10. A method of providing data processing service using an electronic tag that performs an operation of transmitting or receiving a UHF RFID signal to or from a UHF RFID communication device through a first antenna and an operation of transmitting or receiving an NFC signal to or from an NFC device through a second antenna, the method comprising:

detecting, by the electronic tag, whether a first DC voltage corresponding to a result of the rectification of the UHF RFID signal is generated by a UHF RFID tag physical layer;

supplying, by the electronic tag, the first DC voltage to the UHF RFID tag physical layer, a microcontroller unit, and a non-volatile memory when the first DC voltage is detected;

detecting, by the electronic tag, whether a second DC voltage corresponding to a result of the rectification of the NFC signal is generated by an NFC tag physical layer when the first DC voltage is not detected; and supplying, by the electronic tag, the second DC voltage to the NFC tag physical layer, the microcontroller unit, and the non-volatile memory when the second DC voltage is detected, wherein the UHF RFID tag physical layer rectifies the UHF RFID signal acquired through the first antenna using a voltage multiplier circuit to generate the first DC voltage, the NFC tag physical layer rectifies the NFC signal acquired through the second antenna using a bridge rectifier circuit to generate the second DC voltage, the microcontroller unit stores first data processed and second data to be processed by the UHF RFID tag physical layer, and third data processed and fourth data to be processed by the NFC tag physical layer in the non-volatile memory, and the UHF RFID tag physical layer, the NFC tag physical layer, the microcontroller unit, and the non-volatile memory are integrated in the electronic tag, and wherein the first DC voltage, in response to detecting the generation of the first DC voltage only, is supplied by the detector to the UHF RFID tag physical layer without being supplied to the NFC tag physical layer, and the second DC voltage, in response to detecting the generation of the second DC voltage only, is supplied to the NFC tag physical layer without being supplied to the UHF RFID tag physical layer.

11. The method of claim 10,
wherein the electronic tag further includes an active sensor connected to the microcontroller unit through an active sensor interface and a passive sensor connected to the microcontroller unit through a passive sensor interface, and
at least one of the second data and the fourth data is generated by at least one of the active sensor and the passive sensor.

* * * * *